United States Patent
Tran et al.

(10) Patent No.: US 12,449,097 B1
(45) Date of Patent: Oct. 21, 2025

(54) HYDROGEN FUEL STORAGE DEVICE

(71) Applicant: Quyen Dinh Tran, Ho Chi Minh (VN)

(72) Inventors: Quyen Dinh Tran, Ho Chi Minh (VN);
Binh Van Nguyen, Ho Chi Minh (VN);
Thanh Xuan Nguyen, Ho Chi Minh (VN)

(73) Assignees: Quyen Dinh Tran, Ho Chi Minh (VN);
Binh Van Nguyen, Ho Chi Minh (VN)

( * ) Notice: Subject to any disclaimer, the term of this patent is extended or adjusted under 35 U.S.C. 154(b) by 0 days.

(21) Appl. No.: 18/966,165

(22) Filed: Dec. 3, 2024

Related U.S. Application Data

(63) Continuation of application No. 18/946,900, filed on Nov. 13, 2024.

(30) Foreign Application Priority Data

Jun. 7, 2024 (VN) ................ 1-2024-04182

(51) Int. Cl.
| | |
|---|---|
| *F17C 11/00* | (2006.01) |
| *C01B 3/00* | (2006.01) |
| *C01B 32/318* | (2017.01) |
| *F17C 7/02* | (2006.01) |

(52) U.S. Cl.
CPC .......... *F17C 11/005* (2013.01); *C01B 3/0021* (2013.01); *C01B 32/318* (2017.08); *F17C 7/02* (2013.01); *C01P 2006/12* (2013.01); *C01P 2006/14* (2013.01); *C01P 2006/16* (2013.01); *F17C 2203/0325* (2013.01); *F17C 2203/0391* (2013.01); *F17C 2203/0631* (2013.01); *F17C 2203/0646* (2013.01); *F17C 2203/0648* (2013.01); *F17C 2203/0673* (2013.01); *F17C 2205/0323* (2013.01); *F17C 2221/012* (2013.01); *F17C 2227/0323* (2013.01); *F17C 2250/03* (2013.01); *F17C 2250/043* (2013.01); *F17C 2250/0439* (2013.01); *F17C 2250/0443* (2013.01); *F17C 2250/0447* (2013.01);
(Continued)

(58) Field of Classification Search
None
See application file for complete search history.

(56) References Cited

U.S. PATENT DOCUMENTS

| | | | | |
|---|---|---|---|---|
| 3,695,050 A | * | 10/1972 | Bancroft | ............... F17C 3/10 |
| | | | | 220/560.08 |
| 8,430,237 B2 | * | 4/2013 | Westenberger | ......... F17C 7/00 |
| | | | | 220/560.1 |

(Continued)

*Primary Examiner* — Frantz F Jules
*Assistant Examiner* — Webeshet Mengesha

(57) ABSTRACT

The present invention is to provide a hydrogen fuel storage device, comprising: an innermost shell forming a hydrogen storage space; wherein the porous carbon material are filled in the hydrogen storage space; an inner shell forms a shape surrounding the innermost shell; a nitrogen storage space is formed between the outer surface of the innermost shell and the inner surface of the inner shell; an insulation layer surrounding the outer surface of the inner shell; an outer shell surrounding the insulation layer; a vacuum space is formed between the outer surface of the insulation layer and the inner surface of the outer shell; a plurality of heating equipment is arranged inside the nitrogen storage space, a plurality of sensors is arranged inside the hydrogen storage space and the nitrogen storage space.

12 Claims, 6 Drawing Sheets

(52) U.S. Cl.
CPC .............. *F17C 2250/0473* (2013.01); *F17C 2250/0491* (2013.01)

(56) References Cited

U.S. PATENT DOCUMENTS

| | | | | |
|---|---|---|---|---|
| 2004/0060304 | A1* | 4/2004 | Aceves | F17C 3/08 220/560.12 |
| 2008/0314050 | A1* | 12/2008 | Haberbusch | F17C 1/00 62/600 |
| 2009/0241557 | A1* | 10/2009 | Ravex | F17C 3/06 62/53.2 |
| 2014/0117021 | A1* | 5/2014 | Quemerais | B64G 1/402 220/560.12 |
| 2015/0228363 | A1* | 8/2015 | Dewan | G21C 1/22 376/458 |
| 2018/0106427 | A1* | 4/2018 | Leachman | F17C 3/04 |
| 2019/0056064 | A1* | 2/2019 | Swanger | F17C 13/026 |
| 2019/0137175 | A1* | 5/2019 | Park | F25D 19/00 |
| 2020/0011483 | A1* | 1/2020 | Alzaydi | F17C 1/14 |
| 2020/0256513 | A1* | 8/2020 | Brooks | F17C 1/12 |
| 2023/0375139 | A1* | 11/2023 | Cimadevilla García | F17C 13/001 |
| 2024/0353062 | A1* | 10/2024 | Arunachalam | F17C 1/12 |

* cited by examiner

HYDROGEN FUEL STORAGE DEVICE

CLAIM OF PRIORITY

This application is a continuation application of application Ser. No. 18/946,900, entitled "Method for producing hydrogen gas from sweet sorghum", filed on Nov. 13, 2024; this application is also a continuation application of application Ser. No. 1-2024-04182, filed on Jun. 7, 2024, in the Republic Socialist of Vietnam. The patent applications identified above are incorporated here by reference in its entirety to provide continuity of disclosure.

FIELD OF THE INVENTION

The present invention relates to the field of the energy. More specifically, the present invention relates to a hydrogen fuel storage device, used as an alternative to traditional hydrogen fuel storage devices.

BACKGROUND ART

There is considerable interest in replacing fossil fuels with hydrogen because of hydrogen's high energy density per unit weight, its readily availability through the electrolysis of water, and the absence of polluting byproducts from its use. A number of technological components present challenges in making this transition to a hydrogen economy, and in the development of appropriate systems and infrastructure that can integrate into those that already exist. Particularly in the automotive industry, one significant challenge involves the current paucity of fully satisfactory systems for hydrogen storage, ones that are safe, reliable, conformable, lightweight, and comprehensively economic. The technical issues underlying various approaches to hydrogen storage include the form within which hydrogen is stored, the nature of the medium holding the hydrogen, and the operation of the containers holding the medium.

Holding hydrogen either as a compressed gas or as a cryogenic liquid are the currently standard forms of hydrogen storage. Compressed hydrogen can be stored in high pressure tanks. A problem with this method is that hydrogen diffuses very effectively, particularly when under high pressure, and currently available high pressure tanks do not effectively prevent such diffusion over an extended period of time.

When storing as liquid hydrogen, storage is made with a low temperature container and latent heat. Therefore, heat penetrates from outside with the passage of time, and there is gradual vaporization of the liquid hydrogen meaning that appropriate long-term storage is not possible, and so there is low practicality for use as fuel applications. In addition, hydrogen gas must be quickly released after it has been vaporized, and so the use of liquid hydrogen as a fuel is also difficult from the standpoint of efficiency.

Another known hydrogen storage technology, other than the above, is to use carbon materials such as activated carbon and carbon nanotubes for hydrogen storage.

In patent number U.S. Pat. No. 7,036,324B2, discloses a hydrogen storage and supply system comprising: a first hydrogen storage tank; a second hydrogen storage tank comprising an inlet configured to receive hydrogen from the first storage tank; a porous medium contained by the second hydrogen storage tank, the medium having a surface area of at least about 900 $m^2/g$; and an outlet on the second hydrogen storage tank configured to release hydrogen; a cooler and a compressor adapted for cooling and compressing hydrogen released from the second storage tank before returning released hydrogen to the first storage tank, the cooler and compressor disposed between the first storage tank and the second storage tank.

In patent application number US20090199574A1, discloses a hydrogen storage device, comprising: a tank provided with a hydrogen flow opening, and a hydrogen absorbing material in at least one portion of the tank; and a porous magnetic body disposed at the hydrogen flow opening. Wherein, the tank includes a thermal insulating container; the hydrogen flow opening comprises a hydrogen flow inlet and a hydrogen flow outlet, and the porous magnetic body is disposed at the hydrogen flow outlet; the porous magnetic body is disposed so as to be able to exchange heat with a structural member of the tank; the hydrogen absorbing material is activated carbon, carbon nanotubes or MOF; the porous magnetic body is iron oxide, a mixture of silica gel and nickel, or alumina on a chromium oxide carrier.

In patent number KR102537523B1, discloses a hydrogen storage tank using absorption material as storage media, comprising: an innermost shell forming a hydrogen storage space, hydrogen storage materials are filled in the hydrogen storage space, including an inner shell surrounding the inner most shell to form a sealed space between the outer surface of the inner most shell, an outer shell surrounding the inner shell to form a heat insulation space between an outer surface of the inner shell and an outer shell, the inner most shell and the inner shell are connected to a first support in the closed space, the inner shell and the outer shell are connected to a second support in the heat insulation space, the innermost shell includes a non-metallic liner and a fiber reinforced composite material wound on an outer surface of the liner, the inner shell and the outer shell are made of aluminum, the first support and the second support are made of fiber reinforced plastics, characterized in that the hydrogen storage material is inserted into the hydrogen storage container.

It can be seen that the above technical solutions meet the purpose and requirements set out. However, they do not mention the use of heating equipment to raise the temperature of the hydrogen absorbing material to help the hydrogen inside the hydrogen adsorbent material be removed during the process of releasing hydrogen from the hydrogen absorbing material. In addition, the above solutions do not mention the use of sensors used to monitor the temperature and pressure inside the hydrogen storage space, the flow of hydrogen fuel loaded into the hydrogen storage space, the hydrogen fuel content inside the hydrogen storage space; temperature, pressure, and content of nitrogen inside the nitrogen storage space, etc.

Therefore, it is necessary to have a hydrogen fuel storage device uses porous carbon material produced from *Sorghum bicolor* (L.) Moench to adsorb hydrogen fuel, replacing conventional hydrogen fuel storage devices (used to store hydrogen fuel liquid hydrogen fuel storage).

It is also necessary to have a hydrogen fuel storage device uses sensors used to monitor the temperature and pressure inside the hydrogen storage space, the flow of hydrogen fuel loaded into the hydrogen storage space, the hydrogen fuel content inside the hydrogen storage space; temperature, pressure, and content of nitrogen inside the nitrogen storage space, etc.

This invention provides solutions to achieve the above goals.

SUMMARY OF THE INVENTION

The main purpose of the invention is to provide a hydrogen fuel storage device, comprising: an innermost shell forming a hydrogen storage space; wherein the porous carbon materials are filled in the hydrogen storage space; an inner shell forms a shape surrounding the innermost shell; a nitrogen storage space is formed between the outer surface of the innermost shell and the inner surface of the inner shell; wherein the nitrogen storage space contains liquid nitrogen that regulates the temperature of the hydrogen storage space; an insulation layer surrounding the outer surface of the inner shell; wherein the insulation layer is made of aerogel material; an outer shell surrounding the insulation layer; a vacuum space is formed between the outer surface of the insulation layer and the inner surface of the outer shell; a hydrogen fuel input is connected and communicated with the hydrogen storage space, configured to deliver liquid and/or gaseous hydrogen fuel from a liquid hydrogen fuel tank and/or a gaseous hydrogen fuel tank into the hydrogen storage space; a hydrogen fuel output is connected and communicated with the hydrogen storage space, configured to discharge hydrogen fuel out of the hydrogen storage space; a nitrogen input is connected and communicated with the nitrogen storage space, configured to deliver liquid nitrogen from nitrogen tank into the nitrogen storage space; a nitrogen output is connected and communicated with the nitrogen storage space, configured to discharge nitrogen out of the nitrogen storage space; a plurality of heating equipment is arranged inside the nitrogen storage space, wherein the liquid nitrogen contained in the nitrogen storage space is heated by means of the heating equipment, thereby increasing the temperature of the hydrogen storage space to release the hydrogen fuel from the porous carbon materials; and a plurality of sensors is arranged inside the hydrogen storage space and the nitrogen storage space.

The other purpose of the invention is to provide a hydrogen fuel storage device that uses the porous carbon materials produced from sweet sorghum (*Sorghum bicolor* (L.) Moench) to adsorb hydrogen fuel, as an alternative to conventional hydrogen fuel storage devices. The hydrogen fuel storage device uses sensors to monitor the temperature and pressure inside the hydrogen storage space, the hydrogen fuel flow rate inside the hydrogen storage space, the hydrogen fuel content inside the hydrogen storage space; the temperature, pressure, and nitrogen content inside the nitrogen storage space, etc. to monitor its performance during operation.

These and other advantages of the present invention will no doubt become obvious to those of ordinary skill in the art after having read the following detailed description of the preferred embodiments, which are illustrated in the various drawing Figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skills in the art that the present invention may be practiced without these specific details. In other instances, well-known methods, procedures, components, and circuits have not been described in detail so as not to unnecessarily obscure aspects of the present invention.

Figure 1:
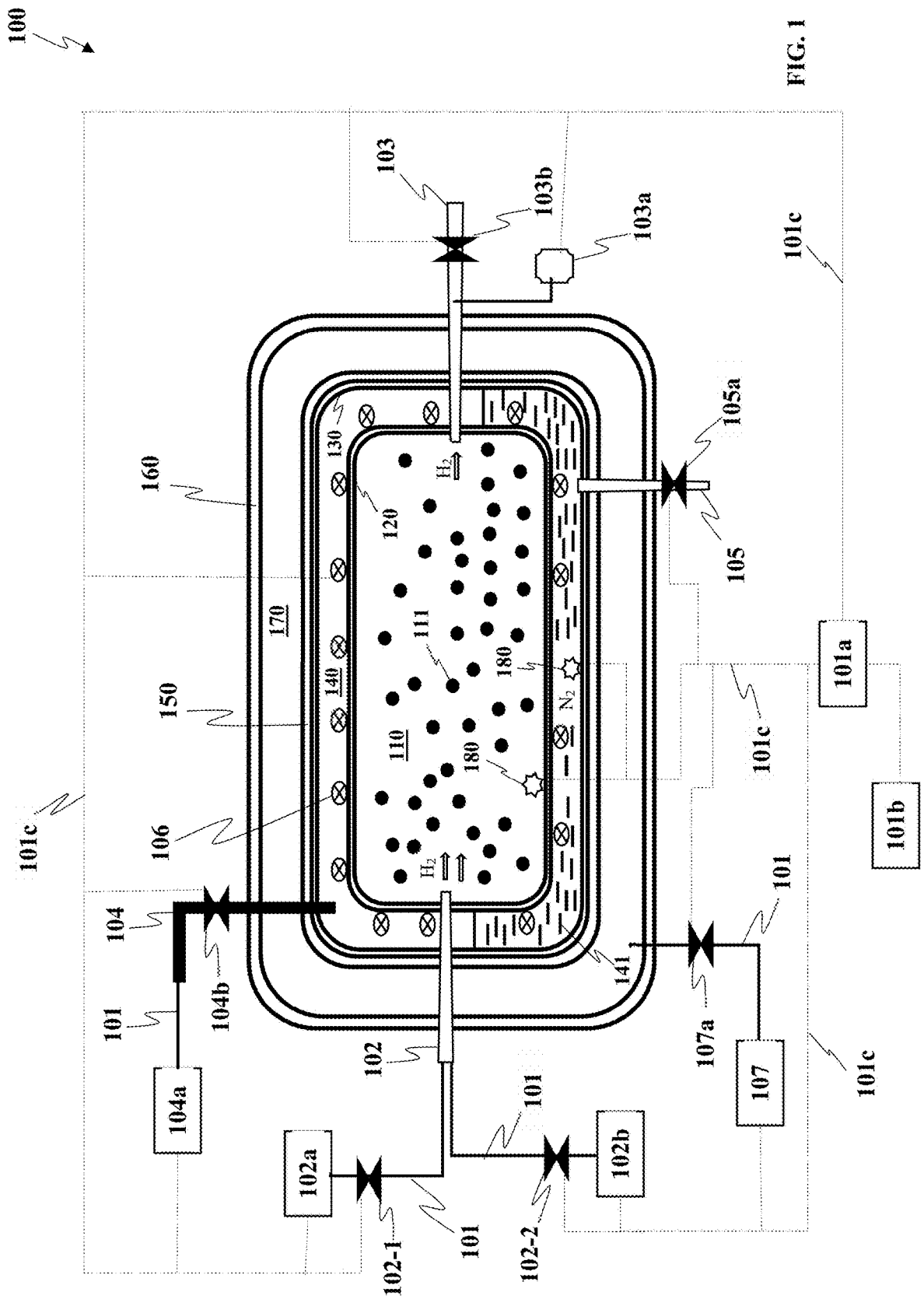
FIG. 1 illustrating the hydrogen fuel storage device in accordance with an exemplary embodiment of the present invention.

With reference to FIG. 1, a hydrogen fuel storage device 100, comprising an innermost shell 120, an inner shell 130, a nitrogen storage space 140, an insulation layer 150, an outer shell 160, a vacuum space 170, and a plurality of heating equipment 106.

The innermost shell 120 forming the hydrogen storage space 110, wherein the porous carbon materials 111 are filled in the hydrogen storage space 110. According to different embodiments of the present invention, the porous carbon materials 111 are obtained by method 300 and is described below. The liquid and/or gaseous hydrogen fuel introduced into the hydrogen storage space 110 by means of a hydrogen fuel input 102. The hydrogen fuel input 102 further connected to a liquid hydrogen fuel tank 102a and a gaseous hydrogen fuel tank 102b by means of pipes 101. On the pipe 101 connecting the hydrogen fuel input 102 and the liquid hydrogen fuel tank 102a, a first valve 102-1 is installed. On the pipe 101 connecting the hydrogen fuel input 102 and the gaseous hydrogen fuel tank 102b, a second valve 102-2 is installed. A hydrogen fuel output 103 is connected and communicated with the hydrogen storage space 110, configured to discharge hydrogen fuel out of the hydrogen storage space 110. On the hydrogen fuel output 103 a pressure valve 103a and a third valve 103b are installed, wherein the pressure valve 103a, operable to regulate the pressure in the hydrogen storage space 110. According to different embodiments of the present invention, the innermost shell 120 is made of aluminum alloy.

The inner shell 130 forms a shape surrounding the innermost shell 120, wherein the inner shell 130 is made of carbon fiber reinforced composite material.

The nitrogen storage space 140 is formed between the outer surface of the innermost shell 120 and the inner surface of the inner shell 130, wherein the nitrogen storage space 140 contains liquid nitrogen 141 that regulates the temperature of the hydrogen storage space 110. The liquid nitrogen 141 is introduced into the nitrogen storage space 140 by means of a nitrogen inlet 104. The nitrogen inlet 104 is connected to a nitrogen tank 104a by means of pipe 101, on the pipe 101, a fourth valve 104b is also installed. A nitrogen output 105 is configured to discharge nitrogen out of the nitrogen storage space 140. On the nitrogen output 105 a fifth valve 105a is installed.

The insulation layer 150 surrounding the outer surface of the inner shell 130, wherein the insulation layer 150 is made of aerogel material.

The outer shell 160 forms a shape surrounding the insulation layer 150, made of carbon fiber reinforced composite material. The outer surface of the outer shell 160 is exposed to the external environment. The vacuum space 170 is formed between the outer surface of the insulation layer 150 and the inner surface of the outer shell 160. The vacuum space 170 has vacuum pressure, combined with the insulation layer 150 to block the heat flow into the inner shell 130, and at the same time to stabilize the temperature of the nitrogen inside the nitrogen storage space 140. According to different embodiments of the present invention, a vacuum pump 107 is connected to the vacuum space 170 by means of pipe 101, providing vacuum pressure to the vacuum space 170. On the pipe 101 connecting the vacuum pump 107 and the vacuum space 170 a sixth valve 107a is installed.

According to different embodiments of the present invention, plurality of heating equipment 106 are arranged inside the nitrogen storage space 140, wherein the liquid nitrogen 141 contained in the nitrogen storage space 140 is heating by means of the heating equipment 106. When the liquid nitrogen 141 is heated to a predetermined temperature, such as 160K (−113° C.), the liquid nitrogen 141 which a phase change to a gas is possible in the nitrogen storage space 140, at which point the temperature in the nitrogen storage space 140 will be transferred to the hydrogen storage space 110, causing the temperature of the hydrogen storage space 110 to also increase. Then, hydrogen fuel is released from the porous carbon materials 111.

A plurality of sensors 180 is arranged inside the hydrogen storage space 110 and the nitrogen storage space 140, comprising temperature sensors, pressure sensors, flow sensors, time sensors, content sensors, etc. The sensors 180 inside the hydrogen storage space 110 will monitor parameters such as temperature and pressure inside the hydrogen storage space 110, hydrogen fuel flow rate loaded inside the hydrogen storage space 110, hydrogen fuel content inside the hydrogen storage space 110, etc. The sensors 180 inside the nitrogen storage space 140 will monitor parameters such as temperature, pressure, and nitrogen content inside the nitrogen storage space 140.

According to different embodiments of the present invention, the hydrogen fuel storage device 100 further comprising a controller 101a, and a database 101b is connected to communicate with the controller 101a. The controller 101a connected to the liquid hydrogen fuel tank 102a, the gaseous hydrogen fuel tank 102b, the first valve 102-1, the second valve 102-2, the pressure valve 103a, the third valve 103b, the nitrogen tank 104a, the fourth valve 104b, the fifth valve 105a, the vacuum pump 107, the sixth valve 107a, the plurality of heating equipment 106, and the plurality of sensors 180 by means of the communication channels 101c.

The controller 101a acts as the brain of the system 100. In some exemplary embodiment of the invention, the controller 101a is a—16 or—32 bit, Programmable Logic Controller (PLC), a Supervisory Control and Data Acquisition (SCADA), or any other type of programmable logic array (PLA) consisting of a memory chip and integrated circuits for control logic, monitoring, and communicating. The controller 101a directs the programmable logic controller (PLC) and/or to execute control instructions, communicate with other units, carry out logic and arithmetic operations, and perform internal diagnostics. The controller 101a runs memory routines, constantly checking the PLC to avoid programming errors and ensure the memory is undamaged. Memory provides permanent storage to the operating system for database 101b used by controller unit. Five programming languages are used in the controller 101a and PLC. They are defined by the international standard IEC 61131. Ladder logic is one of the most commonly used PLC languages. Another programming language is function block diagram (FBD). It describes functions between input and output variables. The function, represented by blocks, connects input and output variables. FBD is useful in depicting algorithms and logic from interconnected control systems. Structured Text (ST) is a high-level language that uses sentence commands. In ST, programmers can use "if/then/else," "SQRT," or "repeat/until" statements to create programs. Instruction list (IL) is a low-level language with functions and variables defined by a simple list. Program control is done by jump instructions and sub-routines with optional parameters. Sequential Function Chart (SFC) language is a method of programming complex control systems. It uses basic building blocks that run their own sub-routines. Program files are written in other programming languages. SFC divides large and complicated programming tasks into smaller and more manageable tasks.

The database 101b is configured to store predetermined operational settings. The database 101b is a database built from careful and thorough prior tests for the method for adsorbing hydrogen fuel into porous carbon materials 111 and the method for desorbing hydrogen fuel from porous carbon materials 111. Tests are performed to obtain specific settings include, but not limited to, liquid and gaseous hydrogen fuel flow rate loaded inside the hydrogen storage space 110, temperature and content of nitrogen inside the nitrogen storage space 140, temperature and pressure inside the hydrogen storage space 110, hydrogen fuel content inside the hydrogen storage space 110, etc. When performing the adsorbing hydrogen fuel into porous carbon materials 111 and the desorbing hydrogen fuel from porous carbon materials 111, the settings stored in the database 101b will be loaded into the controller 101a. Then the controller 101a uses these settings to operate the hydrogen fuel storage device 100 according to a specific procedure (the method for adsorbing hydrogen fuel into porous carbon materials 111 and the method for desorbing hydrogen fuel from porous carbon materials 111. Additionally, during operation of the hydrogen fuel storage device 100, the plurality of sensors 180 monitor the operation of the hydrogen fuel storage device 100 and send the results to the controller 101a. The controller 101a compares the real-time sensed operating settings with the predefined operating settings in the database 101b, if the real-time operating settings differ from the predefined operating settings in the database 101b, the controller 101a adjusts the operation of the hydrogen fuel storage device 100.

The method of operating the hydrogen fuel storage device 100 to implement the method for adsorbing hydrogen fuel into porous carbon materials 111 comprising:

Cleaning and checking all connections between the components units to ensure they are correct and secure as described in FIG. 1 above. All component units of the hydrogen fuel storage device 100 are out of service. Checking the content of porous carbon materials 111 inside the hydrogen storage space 110. Then, the settings stored in the database 101b will be loaded into the controller 101a to perform the method for adsorbing hydrogen fuel into porous carbon materials 111.

Next, the nitrogen tank 104a is turned on and the fourth valve 104b is opened, a quantity of liquid nitrogen from the nitrogen tank 104a is charged into the nitrogen storage space 140. The sensors 180 inside the nitrogen storage space 140 are also enabled to monitor content and temperature of the liquid nitrogen 141 inside the nitrogen storage space 140. After the liquid nitrogen 141 has been charged into the nitrogen storage space 140 at a preset content from the controller 101a and database 101b, the fourth valve 104b is closed and the nitrogen tank 104a is turned off.

Next, the sixth valve 107a is opened, and the vacuum pump 107 is turned on to provide vacuum pressure to the vacuum space 170. After creating a vacuum pressure for the vacuum space 170, the sixth valve 107a is closed and the vacuum pump 107 is turned off.

Next, the liquid hydrogen fuel tank 102a is turned on, and the first valve 102-1 is opened, a quantity of liquid hydrogen fuel from the nitrogen tank 104a is charged into the hydrogen storage space 110. The sensors 180 inside the hydrogen storage space 110 are also enabled to monitor the temperature and pressure inside the hydrogen storage space 110, the hydrogen fuel flow rate loaded inside the hydrogen storage space 110, temperature and content of the hydrogen fuel inside the hydrogen storage space 110. After liquid hydrogen fuel has been charged into the hydrogen storage space 110 at a preset content from the controller 101a and database 101b, the first valve 102-1 is closed and the liquid hydrogen fuel tank 102a is turned off. After the method for adsorbing hydrogen fuel into porous carbon materials 111 is complete, the pressure inside the hydrogen storage space 110 is maintained at a pressure preset from the controller 101a and database 101b, such as 25 bar. The sensors 180 inside the nitrogen storage space 140 and inside the hydrogen storage space 110 continuously operate to monitor the operation of the hydrogen fuel storage device 100 and send the results to the controller 101a.

According to different embodiments of the present invention, in order to perform the method for desorbing hydrogen fuel from porous carbon materials 111, the hydrogen fuel storage device 100 operates as follows: the pressure valve 103a is opened to lower the pressure inside the hydrogen storage space 110 to a pressure preset from the controller 101a and the database 101b, at which time the pressure sensors of the sensors 180 installed inside the hydrogen storage space 110 continuously monitor the pressure inside the hydrogen storage space 110. As the pressure inside the hydrogen storage space 110 begins to decrease, the hydrogen fuel also begins to escape from the porous carbon materials 111. When the pressure inside the hydrogen storage space 110 drops to a preset threshold, such as 1 bar (about 100 kPa), the pressure valve 103a is closed, about 60%-70% of the hydrogen fuel inside the porous carbon materials 111 will escape from the porous carbon materials 111, at this time the third valve 103b is opened to drain hydrogen fuel from the hydrogen fuel storage device 100. Next, the heating equipment 106 is turned on, the liquid nitrogen 141 inside the nitrogen storage space 140 is heated to a temperature of 160K (about −113° C.), the temperature inside the hydrogen storage space 110 will also increase causing the remaining hydrogen fuel inside the porous carbon materials 111 to escape. The sensors 180 inside the hydrogen storage space 110 operate continuously to check the hydrogen fuel content inside the hydrogen storage space 110. After releasing all the hydrogen fuel from the porous carbon materials 111, the heating equipment 106 is turned off, the third shut-off valve 103b is closed, all sensors 180 are turned off.

According to different embodiments of the present invention, after releasing all the hydrogen fuel from the hydrogen storage space 110 of the hydrogen fuel storage device 100, to continue the method for adsorbing hydrogen fuel into porous carbon materials 111 (the method for re-adsorbing hydrogen fuel into porous carbon materials), the hydrogen fuel storage device 100 operates as follows: the sensors 180 inside the nitrogen storage space 140 and hydrogen storage space 110 are turned on, the gaseous hydrogen fuel tank 102b is turned on, and the second valve 102-2 is opened, a quantity of gaseous hydrogen fuel is loaded into the hydrogen storage space 110. After gaseous hydrogen fuel has been charged into the hydrogen storage space 110 at a preset content from the controller 101a and database 101b, the second valve 102-2 is closed and the gaseous hydrogen fuel tank 102b is turned off.

Thus, the hydrogen fuel storage device 100 will operate in three main stages:

First stage: the liquid hydrogen fuel tank 102a supplies a quantity of liquid hydrogen fuel to the hydrogen storage space 110, at which first stage the porous carbon materials 111 adsorbs the liquid hydrogen fuel and stores it.

Second stage: desorbing hydrogen fuel from the porous carbon materials 111 inside the hydrogen storage space 110 of the hydrogen fuel storage device 100 for use.

Third stage: the gas hydrogen fuel tank 102b supplies a quantity of gaseous hydrogen fuel to the hydrogen storage space 110, at which first stage the porous carbon materials 111 adsorbs the gaseous hydrogen fuel and stores it.

According to different embodiments of the present invention, the second and third stages will be continuously repeated until the hydrogen fuel storage device 100 is damaged. Therefore, the hydrogen fuel storage device 100 is used for a long time and effectively.

A simple example of the operating settings contained in database 101b for the method for adsorbing hydrogen fuel into porous carbon materials 111 and the method for desorbing hydrogen fuel from porous carbon materials 111 is as follows: liquid hydrogen fuel used to put into the hydrogen storage space 110 has a temperature of 20K (about −253° C.) at atmospheric pressure (about 101 kPa); after the adsorption of liquid hydrogen fuel into the porous carbon materials 111 is completed, the hydrogen storage space 110 has a pressure of 25 bar (about 2500 kPa) and a temperature of 77K (about −196° C.); gaseous hydrogen fuel used to put into the hydrogen storage space 110 has a temperature of 77K (about −196° C.) and a pressure of 25 bar (about 2500 kPa); the temperature of liquid nitrogen 141 when performing the adsorption process of hydrogen fuel into the porous carbon materials 111 is 77K (about −196° C.); after the adsorption of gaseous hydrogen fuel into the porous carbon materials 111 is completed, the hydrogen storage space 110 has a pressure of 25 bar (about 2500 kPa) and a temperature of 77K (about −196° C.); the temperature of liquid nitrogen 141 when performing the process of desorbing hydrogen fuel from the porous carbon materials 111 is 160K (about −113° C.), etc. Please note that this is only a simplified example of the operational settings contained in the database 101b of the present invention. In reality, the database 101b can have other operational settings for performing the method for adsorbing hydrogen fuel into the porous carbon materials 111 and the method for desorbing hydrogen fuel from the porous carbon materials 111.

According to different embodiments of the present invention, the porous carbon materials 111 produced from sweet sorghum (*Sorghum bicolor* (L.) Moench) capable of adsorbing liquid and/or gaseous hydrogen fuel.

According to different embodiments of the present invention, the gaseous hydrogen fuel is obtained by method 200 and is described below. The liquid hydrogen fuel is obtained by liquefying the gaseous hydrogen fuel.

Another aspect of the present application relates to microbial strains stored at Tin Thanh Group Joint Stock Company, including *Clostridium acetobutylicum* TT01, *Caldicellulosiruptor saccharolyticus* TT02, and *Rhodobacter sphaeroides* TT03. These microbial strains have been presented in patent application number U.S. Ser. No. 18/946,900, filed on 13 Nov. 2024.

In the present invention, the strain *Clostridium acetobutylicum* TT01 was isolated from a sorghum cultivation soil sample in Phu Yen Province, Vietnam. This is a Gram-negative, rod-shaped bacterial strain. Identification of the strain *Clostridium acetobutylicum* TT01 was based on morphological characteristics and the 16S rRNA gene sequence region. The sequencing results of the 16S rRNA gene region, using primers 27F (5'-AGAGTTTGATCCTGGCTCAG-3') and 1492R (5'-GGTTACCTTGTTACGACTT-3'), are presented in SEQ ID No.1.

The strain *Clostridium acetobutylicum* TT01 is capable of fermenting a mixture of sweet sorghum stalk juice ingredient and sweet sorghum seed powder ingredient to produce hydrogen gas under dark conditions. This capability is evaluated based on the volume of hydrogen gas generated during the fermentation process, through an experiment assessing the fermentation efficiency of the strain *Clostridium acetobutylicum* TT01. Additionally, the experiment compares fermentation efficiency with reference strains, including *Clostridium acetobutylicum* ATCC 824 (with a designated identifier in the gene bank being AE001438.3), *Clostridium acetobutylicum* ATCC 4259 (with a designated identifier in the gene bank being U09978.1), and *Clostridium acetobutylicum* ATCC 39058 (with a designated identifier in the gene bank being U16164.1). The results of the experiment are presented in Table 1.

Table 1. Results of the experiment assessing the fermentation capability of the strain *Clostridium acetobutylicum* TT01 on a mixture of sweet sorghum stalk juice ingredient and sweet sorghum seed powder ingredient

| Strains | Hydrogen gas volume (mL/L) |
| --- | --- |
| *Clostridium acetobutylicum* TT01 | 286 |
| *Clostridium acetobutylicum* ATCC 824 | 263 |
| *Clostridium acetobutylicum* ATCC 4259 | 254 |
| *Clostridium acetobutylicum* ATCC 39058 | 271 | in which: fermentation was conducted under dark conditions;
the mixing ratio of the sweet sorghum stalk juice ingredient to the sweet sorghum seed powder ingredient was 1:0.15 (w/w);
initial pH was set at 6.5;
fermentation duration was 24 hours;
fermentation temperature was maintained at 30° C.

The results in Table 1 demonstrate that the strain *Clostridium acetobutylicum* TT01 shows the highest fermentation efficiency in converting a mixture of sweet sorghum stalk juice ingredient and sweet sorghum seed powder ingredient into hydrogen gas, reaching 286 mL/L, compared to the other reference strains. Specifically, the strains *Clostridium acetobutylicum* ATCC 824, ATCC 4259, and ATCC 39058 produced only 263 mL/L, 254 mL/L, and 271 mL/L of hydrogen gas, respectively.

In the present invention, the strain *Caldicellulosiruptor saccharolyticus* TT02 was isolated from cow dung samples collected at a cattle farm in Phu Yen Province, Vietnam. This is a Gram-positive, rod-shaped bacterium. The identification of *Caldicellulosiruptor saccharolyticus* TT02 was based on morphological characteristics and 16S rRNA gene sequence analysis. The sequencing results of the 16S rRNA region, using primers 27F (5'-AGAGTTTGATCCTGGCTCAG-3') and 1492R (5'-GGTTACCTTGTTACGACTT-3'), are presented in SEQ ID No.2.

The strain *Caldicellulosiruptor saccharolyticus* TT02 has the ability to ferment a mixture of sweet sorghum stalk juice ingredient and sweet sorghum seed powder ingredient to produce hydrogen gas under dark conditions. This capability was evaluated based on the hydrogen gas volume generated during fermentation, as part of an experiment assessing the fermentation efficiency of *Caldicellulosiruptor saccharolyticus* TT02. The experiment also compared fermentation efficiency with reference strains, including *Caldicellulosiruptor saccharolyticus* Tp8T.6331 (with a designated identifier in the gene bank being NR_036878.1) and *Caldicellulosiruptor saccharolyticus* DSM 8903 (with a designated identifier in the gene bank being NR_074845.1). The results of the experiment are presented in Table 2.

Table 2. Results of fermentation efficiency of *Caldicellulosiruptor saccharolyticus* TT02 on a mixture of sweet sorghum stalk juice ingredient and sweet sorghum seed powder ingredient

| Strains | Hydrogen gas volume (mL/L) |
| --- | --- |
| *Caldicellulosiruptor saccharolyticus* TT02 | 348 |
| *Caldicellulosiruptor saccharolyticus* Tp8T.6331 | 302 |
| *Caldicellulosiruptor saccharolyticus* DSM 8903 | 322 | in which: fermentation was conducted under dark conditions;
the mixing ratio of the sweet sorghum stalk juice ingredient to the sweet sorghum seed powder ingredient was 1:0.15 (w/w);
initial pH was set at 6.5;
fermentation duration was 24 hours;
fermentation temperature was maintained at 30° C.

Based on Table 2, the experimental results show that the strain *Caldicellulosiruptor saccharolyticus* TT02 has the highest fermentation efficiency in converting the mixture of sweet sorghum stalk juice ingredient and sweet sorghum seed powder ingredient to hydrogen gas, achieving 348 mL/L, which surpasses the reference strains. Specifically, the strains *Caldicellulosiruptor saccharolyticus* Tp8T.6331 and DSM 8903 produced only 302 mL/L and 322 mL/L of hydrogen gas, respectively.

In the present invention, the strain *Rhodobacter sphaeroides* TT03 was isolated from soil samples taken from sweet sorghum fields in Phu Yen Province, Vietnam. This is a Gram-negative, rod-shaped bacterium. The identification of the strain *Rhodobacter sphaeroides* TT03 was based on its morphological characteristics and 16S rRNA gene sequence. The sequencing results of the 16S rRNA region, using primers F1 (5'-AGAGTTTGATCCTGGCTCAG-3') and R1 (5'-ACGGCTACCTTGTTACGACT-3'), are presented in SEQ ID No.3.

The strain *Rhodobacter sphaeroides* TT03 has the ability to ferment a mixture of sweet sorghum stalk juice ingredient and sweet sorghum seed powder ingredient to produce hydrogen gas under light conditions. This capability was evaluated based on the volume of hydrogen gas generated during fermentation, as part of an experiment assessing the fermentation efficiency of *Rhodobacter sphaeroides* TT03. Additionally, the experiment compared fermentation efficiency with reference strains, including *Rhodobacter sphaeroides* KD131 (with a designated identifier in the gene bank being CP001150.1), *Rhodobacter sphaeroides* ATCC 17029 (with a designated identifier in the gene bank being CP000579.1), and *Rhodobacter sphaeroides* ND42 (with a designated identifier in the gene bank being PP702412.1). The results of the experiment are presented in Table 3.

Table 3. Results of fermentation efficiency of *Rhodobacter sphaeroides* TT03 on a mixture of sweet sorghum stalk juice ingredient and sweet sorghum seed powder ingredient

| Strains | Hydrogen gas volume (mL/L) |
| --- | --- |
| *Rhodobacter sphaeroldes* TT03 | 587 |
| *Rhodobacter sphaeroides* KD131 | 511 |
| *Rhodobacter sphaeroides* ATCC 17029 | 526 |
| *Rhodobacter sphaeroides* ND42 | 543 | in which: fermentation conducted under light conditions at an intensity of 1500 lux;
the mixing ratio of the sweet sorghum stalk juice ingredient to the sweet sorghum seed powder ingredient was 1:0.15 (w/w);
initial pH was set at 6.5;
fermentation duration was 24 hours;
fermentation temperature was maintained at 30° C.

The experimental results in Table 3 show that *Rhodobacter sphaeroides* TT03 has the highest efficiency in fermenting the mixture of sweet sorghum stalk juice ingredient and sweet sorghum seed powder ingredient to produce hydrogen gas, reaching 587 mL/L under light conditions. Compared to the reference strains, including *Rhodobacter sphaeroides* KD131, ATCC 17029, and ND42, which generated 511 mL/L, 526 mL/L, and 543 mL/L of hydrogen gas, respectively, TT03 demonstrates a significantly superior efficiency.

Figure 2:
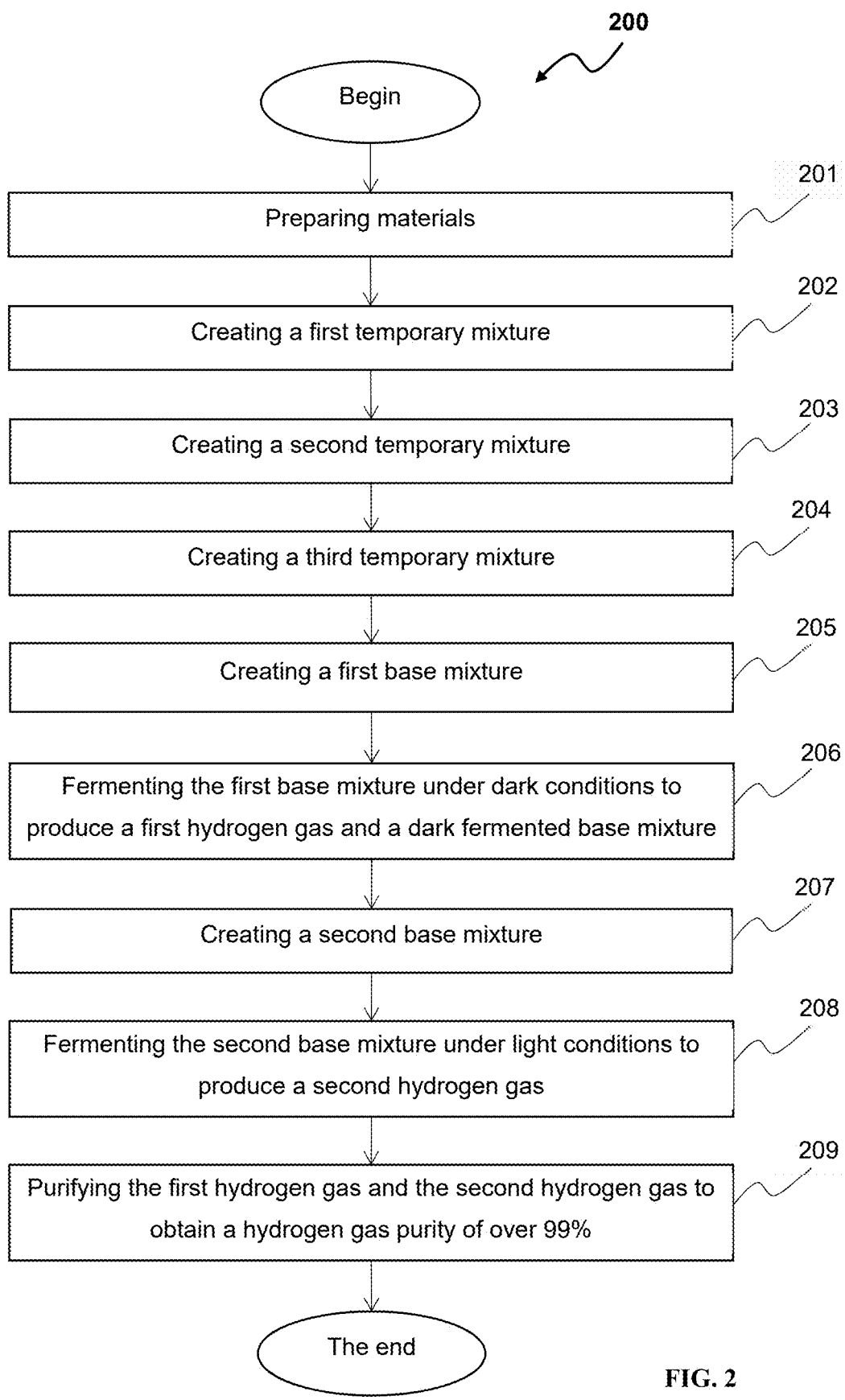
FIG. 2 is a flowchart illustrating a method for producing hydrogen gas ($H_2$) from sweet sorghum.

Another aspect of the present application relates to a method for producing hydrogen gas ($H_2$) from sweet sorghum (*Sorghum bicolor* (L.) Moench) 200 ("method 200"). Referencing FIG. 2, the method 200 begins with at step 201 preparing materials including: a sweet sorghum stalk juice ingredient, a sweet sorghum seed powder ingredient, an alpha-amylase enzyme ingredient, a glucoamylase enzyme ingredient, an organic acid ingredient, a dark fermentation microorganism ingredient, and a light fermentation microorganism ingredient.

In the present invention, the sweet sorghum stalk juice ingredient is obtained by heating the juice from sweet sorghum stalks at 60° C.-70° C. until the Brix level reaches 15-18°Bx.

In the present invention, the sweet sorghum seed powder ingredient is finely ground to a size of 1-2 mm and has a moisture content of less than 12%.

According to the preferred embodiment of the present invention, the sweet sorghum seed powder ingredient has a starch content of 65% to 70%.

In the present invention, the organic acid ingredient is selected from the group consisting of butyric acid, acetic acid, and combinations thereof.

In the present invention, the dark fermentation microorganism ingredient is obtained by mixing a first increased density solution with a second increased density solution in a ratio of (1-3):(1-3).

In the present invention, the first increased density solution by culturing a first microorganism strain on a first growth medium comprising: glucose ($C_6H_{12}O_6$) at 20 g/L, ammonium sulfate (($NH_4$)$_2SO_4$) at 5 g/L, potassium phosphate dibasic ($K_2HPO_4$) at 1 g/L, magnesium sulfate heptahydrate ($MgSO_4 \cdot 7H_2O$) at 0.5 g/L, manganese sulfate monohydrate ($MnSO_4 \cdot H_2O$) at 0.02 g/L, cobalt chloride hexahydrate at 0.01 g/L, vitamin B12 at 0.0001 g/L, and biotin at 0.000005 g/L. Wherein the first microorganism strain is selected from a group consisting of *Clostridium acetobutylicum* ATCC 824 (with a designated identifier in the gene bank being AE001438.3), *Clostridium acetobutylicum* ATCC 4259 (with a designated identifier in the gene bank being U09978.1), *Clostridium acetobutylicum* ATCC 39058 (with a designated identifier in the gene bank being U16164.1), and *Clostridium acetobutylicum* TT01 (SEQ ID No. 1). The preparation of the first growth medium (CGM) is as follows: weigh the components of the medium according to the specified concentrations; dissolve glucose, ammonium sulfate, potassium phosphate dibasic, magnesium sulfate heptahydrate, manganese sulfate monohydrate, and cobalt chloride hexahydrate in distilled water; sterilize the solution at 121° C. for 15 minutes; cool the solution to room temperature (28° C.-32° C.); add vitamin B112 and biotin to the cooled solution; adjust the pH of the solution to 6.8 using hydrochloric acid or sodium hydroxide; filter the solution through sterile filter paper; and distribute the solution into sterile culture flasks.

In the present invention, the second increased density solution by culturing a second microorganism strain on a second growth medium comprising: cellobiose at 5 g/L, peptone at 5 g/L, yeast extract at 5 g/L, sodium bicarbonate ($NaHCO_3$) at 3.5 g/L, ammonium sulfate (($NH_4$)$_2SO_4$) at 3 g/L, resazurin at 0.001 g/L, L-cysteine hydrochloride at 0.1 g/L, vitamin B12 at 0.0001 g/L, and biotin at 0.000005 g/L. Wherein the second microorganism strain is selected from a group consisting of *Caldicellulosiruptor saccharolyticus* Tp8T.6331 (with a designated identifier in the gene bank being NR_036878.1), *Caldicellulosiruptor saccharolyticus* DSM 8903 (with a designated identifier in the gene bank being NR_074845.1), and *Caldicellulosiruptor saccharolyticus* TT02 (SEQ ID No. 2). The preparation of the second growth medium (DSMZ 12104) is as follows: weigh the components of the medium according to the specified concentrations; dissolve cellobiose, peptone, yeast extract, sodium bicarbonate, and ammonium sulfate in distilled water; sterilize the solution at 121° C. for 15 minutes; cool the solution to room temperature (28° C.-32° C.); add resazurin, L-cysteine hydrochloride, vitamin B12, and biotin to the cooled solution; adjust the pH of the solution to 7.0 using hydrochloric acid or sodium hydroxide; filter the solution through sterile filter paper; and distribute the solution into sterile culture flasks.

In the present invention, the dark fermentation microorganism ingredient contains the first microorganism strain with a cell density of $10^9$ CFU/mL and the second microorganism strain with a cell density of $10^9$ CFU/mL.

According to the preferred embodiment of the present invention, the dark fermentation microorganism ingredient contains the strain *Clostridium acetobutylicum* TT01 (SEQ ID No. 1) at a cell density of $10^9$ CFU/mL and the strain *Caldicellulosiruptor saccharolyticus* TT02 (SEQ ID No. 2) at a cell density of $10^9$ CFU/mL.

According to the preferred embodiment of the present invention, the dark fermentation microorganism ingredient has a mixing ratio of the first increased density solution and the second increased density solution is 1:1.

The mixing of the first increased density solution (the first solution) with the second increased density solution (the second solution) helps to enhance the efficiency of hydrogen fermentation. This has been demonstrated through experiments assessing the hydrogen fermentation efficiency of the dark fermentation microorganism ingredient. The results of the experiment are presented in Table 4.

Table 4. Results of the experiment assessing the hydrogen fermentation efficiency of the dark fermentation microorganism ingredient

| Ratio of the first increased density solution: the second increased density solution | $H_2$ yield (cm$^3$/s) | Lactate yield (cm$^3$/s) | Acetate yield (cm$^3$/s) | Ethanol yield (cm$^3$/s) |
|---|---|---|---|---|
| 1:0 | 1.46 | 0.26 | 0.26 | 1.38 |
| 0:1 | 0.76 | 0.64 | 0.45 | 1.56 |
| 3:1 | 1.67 | 0.08 | 0.08 | 1.78 |
| 1:3 | 1.28 | 0.32 | 0.32 | 2.38 |
| 1:1 | 1.9 | 0.06 | 0.06 | 1.63 | in which: values are averages of 3 replicates.

Based on Table 4, the results demonstrate a significant difference in hydrogen production efficiency when adjusting the ratio between the first solution and the second solution. Specifically, when only using the first solution (ratio 1:0), the hydrogen yield reached 1.46 cm$^3$/s, indicating the hydrogen-generating capability of this solution. In contrast, using only the second solution (ratio 0:1) resulted in a yield of 0.76 cm$^3$/s, which is significantly lower, showing that this solution is less effective in hydrogen production compared to the first solution. Notably, when combining the two solutions at different ratios, the hydrogen yield varied significantly. The ratio of 3:1 (more of the first solution) showed a significant increase in yield, reaching 1.67 cm$^3$/s. This suggests that the addition of the second solution enhances the hydrogen-generating capability of the first solution. Conversely, the ratio of 1:3 (more of the second solution) resulted in a decrease in yield to 1.28 cm$^3$/s, but still higher than using the second solution alone. Most remarkably, when the two solutions were mixed at a ratio of 1:1, the hydrogen yield reached its highest level at 1.9 cm$^3$/s. This indicates that an equal mixture of both solutions optimally enhances hydrogen production efficiency.

In the present invention, the light fermentation microorganism ingredient is obtained by culturing a third microorganism strain on a third growth medium comprising: glucose ($C_6H_{12}O_6$) at 10 g/L, yeast extract at 5 g/L, peptone at 5 g/L, sodium chloride (NaCl) at 5 g/L, magnesium sulfate heptahydrate (MgSO$_4$·7H$_2$O) at 1 g/L, potassium dihydrogen phosphate (KH$_2$PO$_4$) at 1 g/L, and calcium chloride dihydrate (CaCl$_2$·2H$_2$O) at 0.1 g/L. Wherein the third microorganism strain is selected from a group consisting of *Rhodobacter sphaeroides* KD131 (with a designated identifier in the gene bank being CP001150.1), *Rhodobacter sphaeroides* ATCC 17029 (with a designated identifier in the gene bank being CP000579.1), *Rhodobacter sphaeroides* ND42 (with a designated identifier in the gene bank being PP702412.1), and *Rhodobacter sphaeroides* TT03 (SEQ ID No. 3). Preparation of the third growth medium (YEM—Yeast Extract Medium) is as follows: weigh each component of the medium according to the specified concentrations: glucose, yeast extract, peptone, sodium chloride, magnesium sulfate heptahydrate, monopotassium phosphate, calcium chloride dihydrate, and dissolve them in distilled water; sterilize the solution at 121° C. for 15 minutes; cool to room temperature (28° C.-32° C.); adjust the pH to 7.0 using hydrochloric acid or sodium hydroxide; filter the solution through sterile filter paper; and distribute it into sterile culture flasks.

In the present invention, the light fermentation microorganism ingredient contains the third microorganism strain with a cell density of $10^9$ CFU/mL.

According to the preferred embodiment of the present invention, the light fermentation microorganism ingredient contains the strain *Rhodobacter sphaeroides* TT03 (SEQ ID No. 3) at a cell density of $10^9$ CFU/mL.

At step 202, creating a first temporary mixture by performing steps (a) to (c), comprising:
(a) mixing the sweet sorghum stalk juice ingredient with the sweet sorghum seed powder ingredient in a ratio of 1:(0.06-0.15) (w/w) at 70° C., then stirring well;
(b) increasing the temperature to 90° C., maintaining at 90° C. for 3-5 minutes; and
(c) reducing the temperature to 85° C., maintaining at 85° C. for 60 minutes.

According to the preferred embodiment of the present invention, the ratio of the sweet sorghum stalk juice ingredient and the sweet sorghum seed powder ingredient is 1:0.15 (w/w).

Mixing the sweet sorghum stalk juice ingredient (the stalk juice) with the sweet sorghum seed powder ingredient (the seed powder) enhances the efficiency of hydrogen fermentation. This is demonstrated through an experiment assessing the hydrogen fermentation efficiency of the stalk juice and the sweet powder. The results of the experiment are presented in Table 5.

Table 5. Results of the experiment assessing the hydrogen fermentation efficiency of the stalk juice and the seed powder

| Ratio of the stalk juice:the seed powder | Sugar content of juice (%) | Starch content of seeds (%) | Theoretical hydrogen yield (%) | Actual hydrogen yield (%) | Hydrogen fermentation efficiency (%) |
|---|---|---|---|---|---|
| 1:0 | 18.89 | 0 | 1.93 | 1.80 | 93.15[c] |
| 1:0.06 | 18.89 | 71.57 | 2.248 | 2.10 | 93.41[c] |
| 1:0.09 | 18.89 | 71.57 | 2.407 | 2.25 | 93.55[b] |
| 1:0.12 | 18.89 | 71.57 | 2.566 | 2.41 | 93.91[b] |
| 1:0.15 | 18.89 | 71.57 | 2.725 | 2.60 | 95.48[a] |
| 0:1 | 0 | 71.57 | 1.59 | 1.44 | 90.75[d] | in which: values are averages of 3 replicates;
values within the same column sharing the same letter indicate no statistically significant difference at the 5% level.

Based on Table 5, the results show a significant impact of the ratio between the stalk juice and the seed powder on fermentation efficiency. Firstly, when only the stalk juice is used (ratio 1:0), the fermentation efficiency reaches 93.15%, indicating good hydrogen fermentation efficiency. However, when the stalk juice is combined with the seed powder, from a ratio of 1:0.06 to 1:0.15, the fermentation efficiency gradually increases from 93.41% to 95.48%. This indicates that the combination of stalk juice and seed powder enhances the hydrogen fermentation efficiency. Conversely, when only the seed powder is used (ratio 0:1), the fermentation efficiency drops to 90.75%, which is lower than the other ratios. This shows that using the seed powder alone results in lower hydrogen fermentation efficiency compared to combining it with the stalk juice.

At step 203, creating a second temporary mixture by mixing the alpha-amylase enzyme ingredient with the first temporary mixture in a ratio of (0.05-0.2):1000 (w/w), adjusting the pH to 5.5-6.5, then incubating at 9000-10000 for 30-60 minutes.

According to the preferred embodiment of the present invention, the mixing ratio of the alpha-amylase enzyme ingredient and the first temporary mixture is 0.1:1000 (w/w).

At step 204, creating a third temporary mixture by performing steps (a') to (c'), comprising:
(a') mixing the glucoamylase enzyme ingredient with the second temporary mixture in a ratio of (0.05-0.2):1000 (w/w), adjusting the pH to 4.0-5.0;
(b') incubating at 90° C.-100° C. for 30-60 minutes; and
(c') cooling to a temperature of 25° C.-30° C.

According to the preferred embodiment of the present invention, the mixing ratio of the glucoamylase enzyme ingredient and the second temporary mixture is 0.1:1000 (w/w).

At step 205, creating a first base mixture by performing steps (a") to (c"), comprising:
(a") mixing the glucoamylase enzyme ingredient with the third temporary mixture in a ratio of (0.05-0.2):1000 (w/w) and stirring well to obtain a fourth temporary mixture;
(b") mixing the organic acid ingredient with the fourth temporary mixture in a ratio of (2-5):1000 (w/w) and stirring well to obtain a fifth temporary mixture; and
(c") mixing the dark fermentation microorganism ingredient with the fifth temporary mixture in a ratio of (1-2):1000 (w/w) and stirring well to obtain the first base mixture.

According to the preferred embodiment of the present invention, the mixing ratio of the glucoamylase enzyme ingredient and the third temporary mixture is 0.1:1000 (w/w).

According to the preferred embodiment of the present invention, the mixing ratio of the dark fermentation microorganism ingredient and the fifth temporary mixture is 1.5:1000 (w/w).

At step 206, fermenting the first base mixture under dark conditions at a temperature of 25° C.-30° C. for 22-26 hours to produce a first hydrogen gas and a dark fermented base mixture. Wherein the pH is controlled from 6.0-6.5 and the dissolved oxygen concentration is controlled to be less than 1%.

According to the preferred embodiment of the present invention, the fermentation time for the first base mixture under dark conditions is 26 hours.

At step 207, creating a second base mixture by mixing the light fermentation microorganism ingredient with the dark fermented base mixture in a ratio of (1-2):1000 (w/w) and stirring well.

According to the preferred embodiment of the present invention, the ratio of the light fermentation microorganism ingredient and the dark fermented base mixture is 1.5:1000 (w/w).

At step 208, fermenting the second base mixture under light conditions at a light intensity of 1500-2000 lux, a temperature of 25° C.-30° C., a stirring speed of 200-300 rpm, and for a duration of 22-26 hours to produce a second hydrogen gas. Wherein the pH is controlled from 6.5-7.0.

In the present invention, a hydrogen gas obtained from method 200 is a mixture of the first hydrogen gas obtained from fermentation under dark conditions (step 206) and the second hydrogen gas obtained from fermentation under light conditions (step 208).

According to the preferred embodiment of the present invention, the light intensity during the fermentation of the second base mixture is 1500 lux.

According to the preferred embodiment of the present invention, the fermentation time for the second base mixture under light conditions is 24 hours.

Reference Table 6 shows the results of an experiment investigating the hydrogen production efficiency of method 200, applied to produce hydrogen from 440 g of the sweet sorghum stalk juice ingredient 66 g of the sweet sorghum seed powder ingredient, when combining dark fermentation and light fermentation. This experiment compares the hydrogen fermentation efficiency of the method 200 with the method 200 without light fermentation and the method 200 without dark fermentation.

Table 6. Results of the experiment investigating the hydrogen production efficiency of method 200

| Experimental condition | Experimental conditions | Hydrogen gas yield (g) |
|---|---|---|
| 1 | Dark fermentation (Method 200 without light fermentation) | 6.56 |
| 2 | Light fermentation (Method 200 without dark fermentation) | 11.84 |
| 3 | Combined dark and light fermentation (Method 200) | 20.64 | in which: values are averages of 3 replicates

The experimental results on the influence of fermentation conditions on hydrogen gas yield demonstrate significant differences among the methods. In Experiment 1, employing only dark fermentation (without light), the hydrogen gas yield was 6.56 g, indicating that this process can produce hydrogen but with lower efficiency. In contrast, Experiment 2, utilizing only light fermentation (without dark), showed an increased hydrogen yield of 11.84 g, highlighting that fermentation under 1500 lux light significantly enhances hydrogen production efficiency. Particularly noteworthy, Experiment 3, combining both dark and light fermentation conditions, yielded the highest result of 20.64 g of hydrogen gas. This output surpasses the combined yields from the individual methods, underscoring the synergistic effect of employing both dark and light fermentation conditions.

According to the preferred embodiment of the present invention, the method 200 further comprises step 209, which involves purifying the first hydrogen gas obtained from the fermentation under dark conditions (step 206) and the second hydrogen gas obtained from the fermentation under light conditions (step 208) to obtain the gaseous hydrogen fuel with a purity of over 99%.

Figure 3:
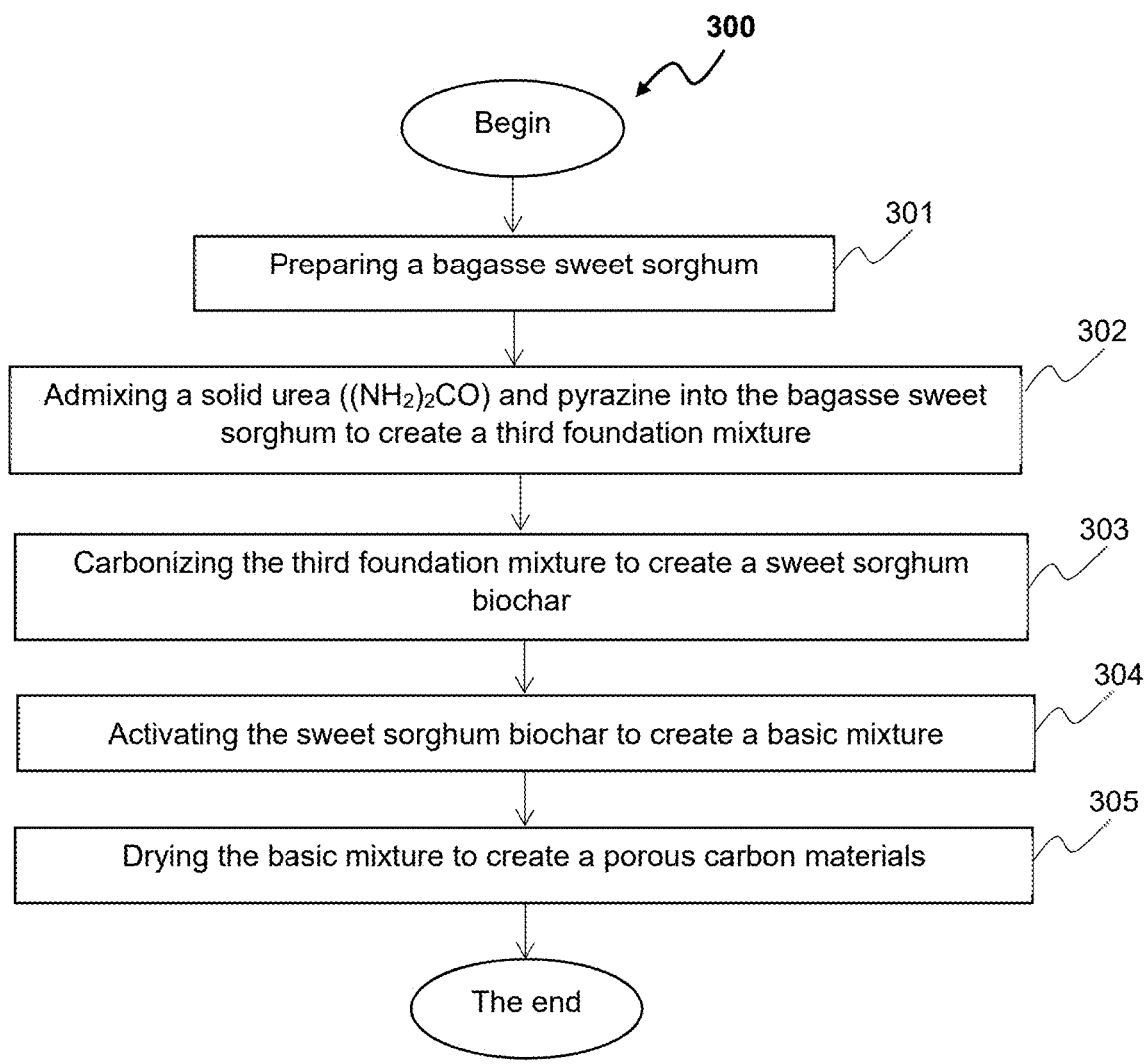
FIG. 3 is a flowchart illustrating a method of manufacturing porous carbon materials derived from sweet sorghum (*Sorghum bicolor* (L.) Moench)

Referencing FIG. 3, it is a flowchart illustrating a method of manufacturing porous carbon materials 111 derived from sweet sorghum (*Sorghum bicolor* (L.) Moench) 300 ("method 300") according to the embodiment of the present invention. The method 300 begins with at step 301 preparing a bagasse sweet sorghum including steps:

(a) collecting sweet sorghum stalks; in which sweet sorghum stalks have 12-14 Brix, and moisture of 75%-85%;

(b) pressing sweet sorghum stalks to collect bagasse; in which bagasse includes the following characteristics: moisture of 45%-50%, 3-5 Brix, cellulose and hemicellulose content greater than 60%, and 13% lignin;

(c) grinding and sifting the bagasse to the desired size of 1-2 mm;

(d) steaming the bagasse at step (c) at 121° C. for 27 minutes; mixing the bagasse after steaming with a preparation containing *Brevibacillus thermoruber* BT2 at a ratio of 0.5-1%, incubating at 25° C.-28° C., for 7-10 days to create a bagasse remove lignin; in which, *Brevibacillus thermoruber* BT2 has the identification code in the gene bank as NR_026514.1;

(e) soaking the bagasse remove lignin at step (d) in a mixed solution containing furfural ($C_5H_4O_2$), 2-aminophenol and deionized water at a ratio of 1:2 (wt/v); and then placed on a magnetic stirrer at 70° C. for 2-3 days; in which, the mixed solution contains furfural ($C_5H_4O_2$), 2-aminophenol and deionized water at a ratio of (3-4):1:80 (v/v); and (f) drying the crushed bagasse at a temperature of 120° C., until the bagasse sweet sorghum reaches having moisture of 10%-15%; and then rinse once in deionized water and twice in 100% ethanol, to remove any remaining impurities.

According to the embodiment of the invention, the sweet sorghum bagasse has a specific gravity of materials is 0.1691±0.002 g/cm³.

At step 302, admixing a solid urea (($NH_2$)$_2$CO) at a ratio of 2,2-6,5% w/w and pyrazine with content of 1%-3% into the bagasse sweet sorghum at step 301 to create a third foundation mixture having 1%-3% by weight of nitrogen content; in which urea (($NH_2$)$_2$CO) having 46% by weight of nitrogen content.

At step 303, carbonizing the third foundation mixture at step 302 in an inert gas environment with a heating rate of 4° C./min until the temperature reaches 500° C., then maintain the temperature of 500° C. for 2 hours to create a sweet sorghum biochar.

According to the embodiment of the invention, the inert gas environment is nitrogen ($N_2$) or Argon (Ar).

According to the embodiment of the invention, the sweet sorghum biochar has a specific gravity of 0.1334±0.003 g/cm³.

According to the embodiment of the invention, the sweet sorghum biochar has an electrical conductivity of 200-300 S/cm.

At step 304, activating the sweet sorghum biochar at step 103 comprising steps performed in the following formula:

(A) admixing 50 g of sweet sorghum biochar at step 303 with 150-200 g of an alkaline flake powder has a concentration of 80%, and 1-3 g metal salt $ZnCl_2$ or $CuCl_2$ with stirring, and grinding to create a charcoal powder having a size of 1-2 mm;

(B) adding 100 mL of distilled water to the charcoal powder at step (A) combined with stirring, then ultrasonic treatment at 20-40 kHz frequency for 20-25 hours to create a sixth temporary mixture;

(C) drying the sixth temporary mixture at step (B) at 120° C. for 24 hours to create a seventh temporary mixture;

(D) heating the seventh temporary mixture at step (C) comprising two stages:

first stage: heating the seventh temporary mixture with a heating rate of 3° C./min until the temperature reaches 300° C. and maintaining the temperature of 300° C. for 1 hour;

second stage: continue the heating process of the seventh temporary mixture with a heating rate of 3° C./min until the temperature reaches 800° C. and maintain the temperature of 800° C. for 2 hours, to create an eighth temporary mixture; and (E) cooling the eighth temporary mixture, then a first washing by 0.5 liters of hydrochloric acid (HCl) 0.1 M solution, and a second washing by distilled water until the washing water has a pH of 6-7 to create a basic mixture.

According to the embodiment of the invention, the alkaline flake powder is potassium hydroxide (KOH) or sodium hydroxide (NaOH).

According to the embodiment of the invention, the ultrasonic at 30 kHz for 24 hours.

Finally, at step 305, drying the basic mixture at step 304 at 110° C. for 12 hours to create porous carbon materials 111.

According to the embodiment of the invention, the porous carbon materials 111 derived from sweet sorghum has characteristics including surface area of 3000-4000 m²/g, pore size of 0.7 mm, hydrogen storage density of 0.05-0.1 g/cm³, chemical stability, and maximum temperature of 1000° C., and hydrogen adsorption ($H_2$) is 5%-7%.

According to the preferred embodiment of the present invention, the porous carbon materials 111 derived from sweet sorghum has characteristics characterized in that the porous carbon material is obtained by the process 100 has characteristics including surface area of 3500 m²/g, pore size of 0.7 mm, hydrogen storage density of 0.07 g/cm³, chemical stability, and maximum temperature of 1000° C., and hydrogen adsorption ($H_2$) is 7%.

Figure 4:
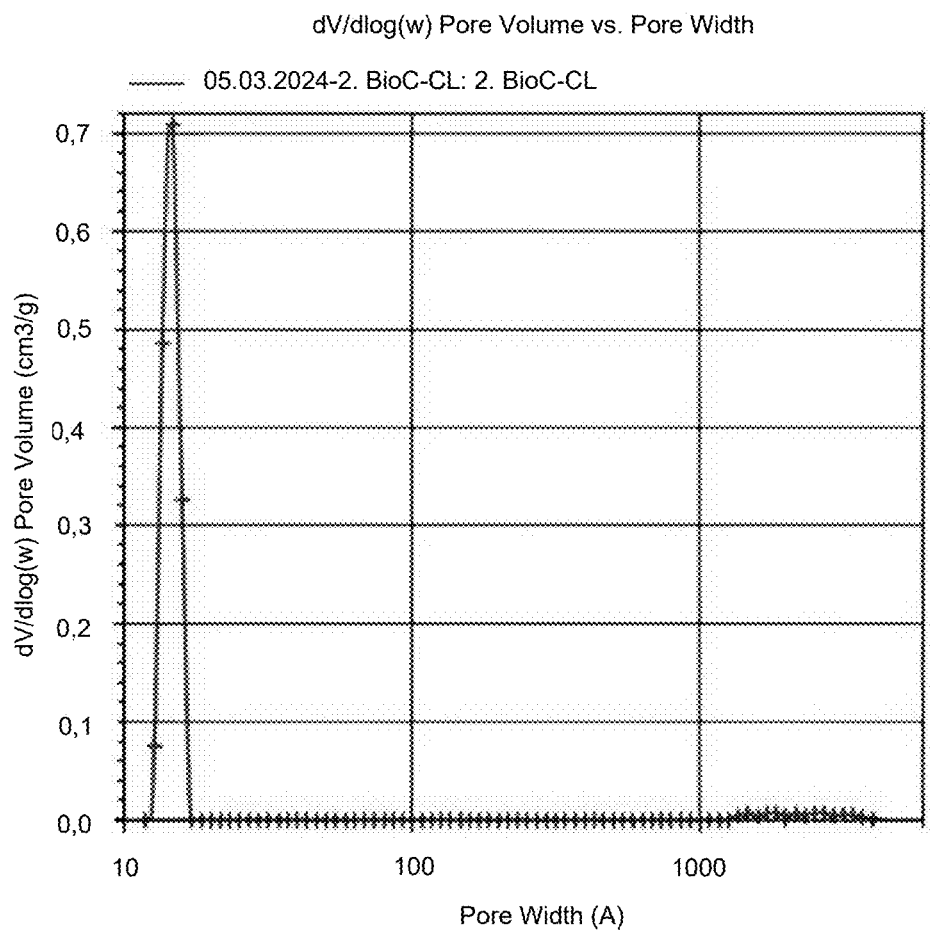
FIG. 4 is a pore volume distribution plots of the sweet sorghum biochar.
Figure 5:
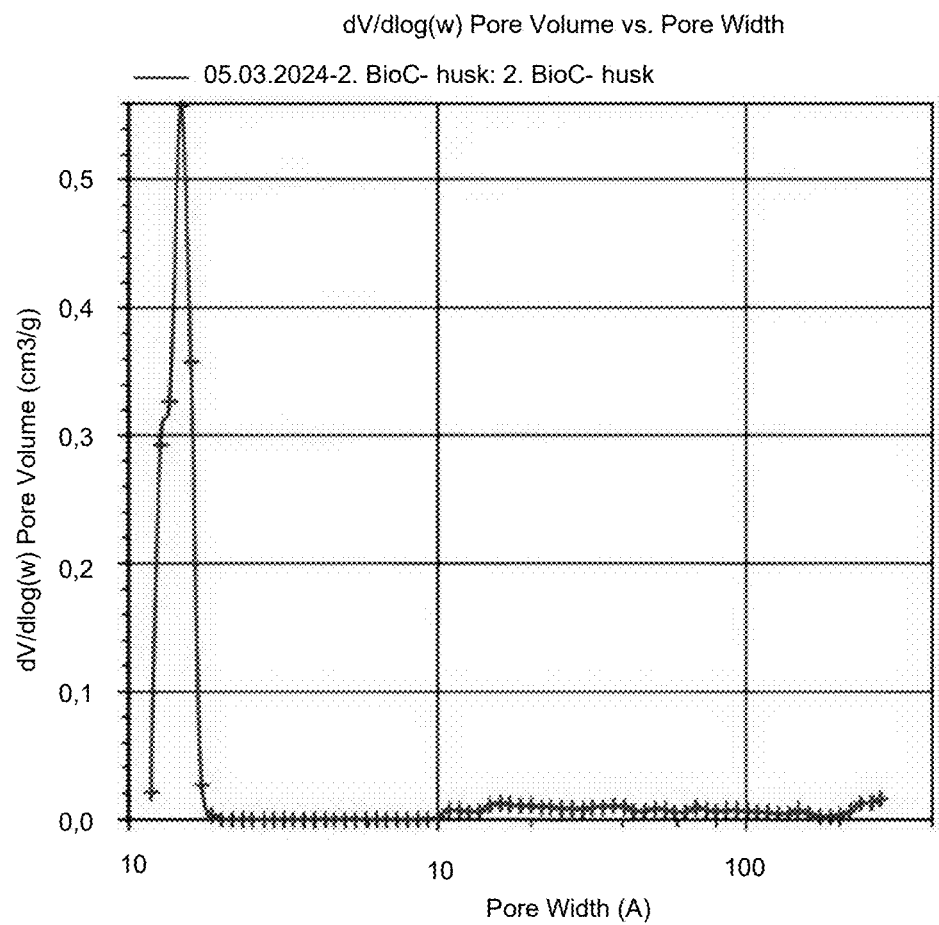
FIG. 5 is a pore volume distribution plots of the husk biochar.
Figure 6:
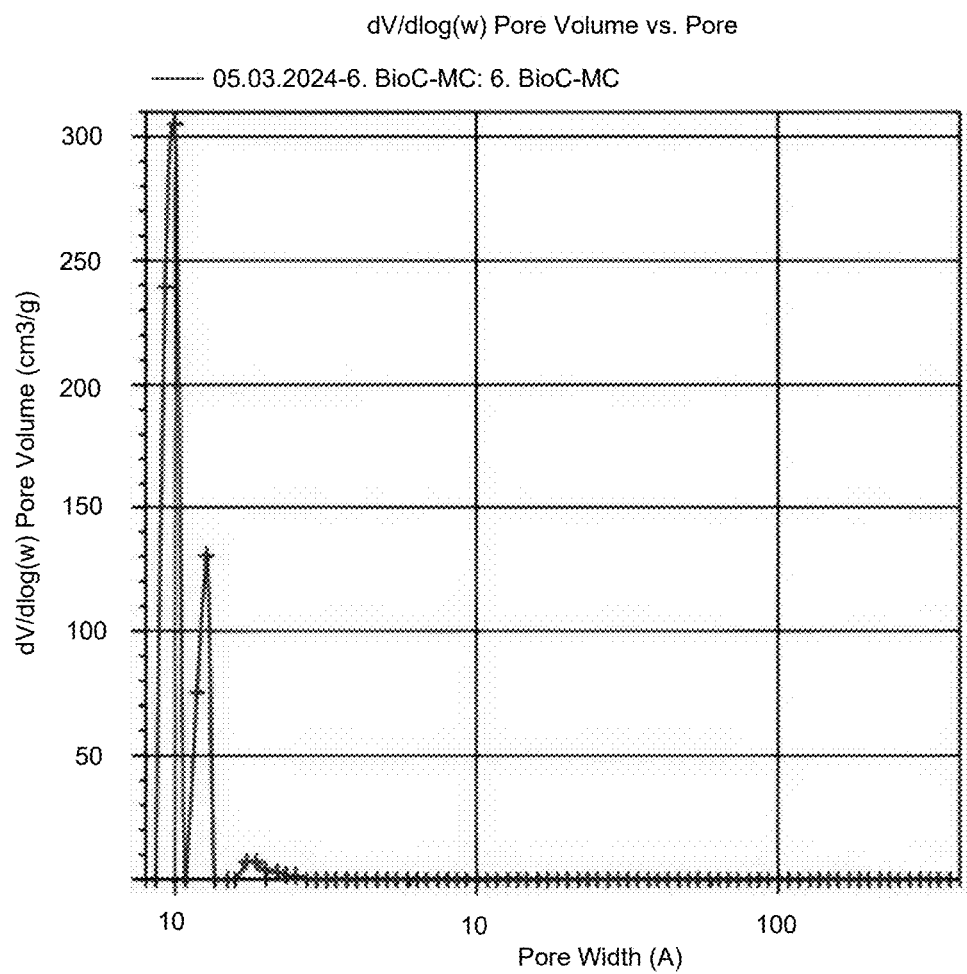
FIG. 6 is a pore volume distribution plots of the wood sawdust biochar.

Referencing from FIG. 4 to FIG. 6, survey characteristics of the sweet sorghum biochar through pore analysis using the NLDFT adsorption analysis method showed the sweet sorghum biochar has pore size uniformity (~1.1 nm) compared to husk biochar and wood sawdust biochar. The uniform pores will orient the development of a big system of uniform pores in the activation process. Combining heat treatment reasonably to adjust the pore size in the activation process by changing the highest activation temperature and the time maintaining this temperature will be able to create an optimal and uniform pore size. (0.7 nm). This shows that bagasse sweet sorghum has the potential to produce porous carbon and possibly store $H_2$ fuel after activation.

Referencing example 1, the method 300 is applied to produce the porous carbon materials 111 derived from sweet sorghum (materials 1) according to the exemplary embodiment of the present invention. Namely:

(A) prepare bagasse sweet sorghum:
collecting 100 kg sweet sorghum stalks;
pressing sweet sorghum stalks to collect 50 kg bagasse;
grinding 50 kg bagasse and sifting to a size of 1-2 mm;

steaming the bagasse at 121° C. for 27 minutes; then mixing the bagasse with 0.5 kg preparation containing *Brevibacillus thermoruber* BT2, incubating at 27° C., for 8 days to create a bagasse remove lignin;

soaking the bagasse remove lignin in 100 L mixed solution containing furfural ($C_5H_4O_2$), 2-aminophenol and deionized water, and then placed on a magnetic stirrer at 70° C. for 3 days.

drying 50 kg bagasse crushed at a temperature of 120° C., to obtain 6 kg bagasse sweet sorghum;

(B) adjusting the nitrogen content of 6 kg of the bagasse by admixing with 0.32 kg solid urea (($NH_2)_2CO$) and 0.18 kg pyrazine to create a 6.5 kg the third foundation mixture having nitrogen content of 1.2% by weight;

(C) carbonizing 6.5 kg of the third foundation mixture in an inert gas environment ($N_2$) with a heating rate of 4° C./min until the temperature reached 500° C., then maintaining the temperature of 500° C. for 2 hours with a recovery efficiency of 18.1%, 1.1 kg was recovered sweet sorghum biochar;

(D) activating 1.1 kg of sweet sorghum biochar by:
  admixing 1.1 kg of sweet sorghum biochar with 3.25 kg of alkaline flake powder has a concentration of 80% and 0.05 kg $ZnCl_2$ with stirring, and grinding to a size of 1-2 mm to obtain 4.4 kg of charcoal powder;
  adding 2.2 liters of distilled water to 4.4 kg of charcoal powder with stirring, then performing an ultrasound at a frequency of 20-40 kHz, 20-25 hours to obtain 6.6 kg of the sixth temporary mixture;
  drying 6.6 kg of the sixth temporary mixture at 120° C. for 24 hours to obtain 1 kg of the seventh temporary mixture;
  heating 1 kg of the seventh temporary mixture comprising two stages:
    the first stage: heating 1 kg of the seventh temporary mixture with a heating rate of 3° C./min until the temperature reaches 300° C. and maintaining the temperature of 300° C. for 1 hour;
    the second stage: continue the heating process of the seventh temporary mixture with a heating rate of 3° C./min until the temperature reaches 800° C. and maintain the temperature of 800° C. for 2 hours, to obtain 1 kg of the eighth temporary mixture; and
  cooling 1 kg of the eighth temporary mixture, then wash the first time with 10 liters of hydrochloric acid (HCl) 0.1 M solution, and wash the second time with distilled water until the washing water has a pH of 6-7 to obtain 1 kg of the basic mixture;

(E) drying 1 kg of the basic mixture at 110° C. for 12 hours to obtain 0.5 kg of the porous carbon materials 111.

Example 2: creating the porous carbon materials 111 derived from sweet sorghum (materials 2) synthesized according to method 300, the same as example 1 above, including Step (A) to Step (E); the difference is:
  At step (C), the inert gas environment is Argon (Ar), with a recovery efficiency of 19%, 1.2 kg was recovered sweet sorghum biochar;
  At step (D), admixing 1.2 kg of sweet sorghum biochar with 3.55 kg of alkaline flake powder and 0.05 kg $ZnCl_2$ to obtain 4.8 kg of charcoal powder;
    adding 2.4 liters of distilled water to 4.8 kg of charcoal powder to obtain 7.2 kg of the sixth temporary mixture;
    drying 7.2 kg of the sixth temporary mixture to obtain 1.44 kg of the seventh temporary mixture;
    heating 1.44 kg of the seventh temporary mixture to obtain 1.44 kg of the eighth temporary mixture; and
    cooling 1.44 kg of the eighth temporary mixture, then wash the first time with 14.4 liters of hydrochloric acid (HCl) 0.1 M solution, and wash the second time with distilled water to obtain 1.44 kg of the basic mixture;
  At step (E), drying 1.44 kg of the basic mixture to obtain 0.72 kg of the porous carbon materials 111.

Example 3: creating the porous carbon materials 111 derived from sweet sorghum (materials 3) synthesized according to method 300, the same as example 1 above, including Step (A) to Step (E); the difference is:
  At step (C), the inert gas environment is nitrogen ($N_2$), with a recovery efficiency of 25%, 1.6 kg was recovered sweet sorghum biochar;
  At step (D), admixing 1.6 kg of sweet sorghum biochar with 4.75 kg of alkaline flake powder and 0.05 kg $ZnCl_2$ to obtain 6.4 kg of charcoal powder;
    adding 3.2 liters of distilled water to 6.4 kg of charcoal powder to obtain 9.6 kg of the sixth temporary mixture;
    drying 9.6 kg of the sixth temporary mixture to obtain 2 kg of the seventh temporary mixture;
    heating 2 kg of the seventh temporary mixture to obtain 2 kg of the eighth temporary mixture; and
    cooling 2 kg of the eighth temporary mixture, then wash the first time with 20 liters of hydrochloric acid (HCl) 0.1 M solution, and wash the second time with distilled water to obtain 2 kg of the basic mixture;
  At step (E), drying 2 kg of the basic mixture to obtain 1 kg of the porous carbon materials 111.

Example 4: creating the porous carbon materials 111 derived from sweet sorghum (material 4) synthesized according to method 300, the same as example 1 above, including Step (A) to Step (E); the difference is:
  At step (C), the inert gas environment is Argon (Ar), with a recovery efficiency of 18.1%, 1.1 kg was recovered sweet sorghum biochar;
  At step (D), admixing 1.1 kg of sweet sorghum biochar with 4.35 kg of alkaline flake powder and 0.05 kg $ZnCl_2$ to obtain 5.5 kg of charcoal powder;
    adding 2.75 liters of distilled water to 5.5 kg of charcoal powder to obtain 8.25 kg of the sixth temporary mixture;
    drying 8.25 kg of the sixth temporary mixture to obtain 1.65 kg of the seventh temporary mixture;
    heating 1.65 kg of the seventh temporary mixture to obtain 1.65 kg of the eighth temporary mixture; and
    cooling 1.65 kg of the eighth temporary mixture, then wash the first time with 16.5 liters of hydrochloric acid (HCl) 0.1M solution, and wash the second time with distilled water to obtain 1.65 kg of the basic mixture;
  At step (E), drying 1.65 kg of the basic mixture to obtain 0.825 kg of the porous carbon materials 111.

Example 5: creating the porous carbon materials 111 derived from sweet sorghum (material 5) synthesized according to method 300, the same as example 1 above, including Step (A) to Step (E); the difference is:
  At step (C), the inert gas environment is Argon (Ar), with a recovery efficiency of 19%, 1.2 kg was recovered sweet sorghum biochar;
  At step (D), admixing 1.2 kg of sweet sorghum biochar with 4.75 kg of alkaline flake powder and 0.05 kg $ZnCl_2$ to obtain 6 kg of charcoal powder;

adding 3 liters of distilled water to 6 kg of charcoal powder to obtain 9 kg of the sixth temporary mixture;

drying 9 kg of the sixth temporary mixture to obtain 1.8 kg of the seventh temporary mixture;

heating 1.8 kg of the seventh temporary mixture to obtain 1.8 kg of the eighth temporary mixture;

cooling 1.8 kg of the eighth temporary mixture, then wash the first time with 18 liters of hydrochloric acid (HCl) 0.1 M solution, and wash the second time with distilled water to obtain 1.8 kg of the basic mixture;

At step (E), drying 1.8 kg of the basic mixture to obtain 0.9 kg of the porous carbon materials 111.

Example 6: creating the porous carbon materials 111 derived from sweet sorghum (material 5) synthesized according to method 300, the same as example 1 above, including Step (A) to Step (E); the difference is:

At step (C), the inert gas environment is nitrogen ($N_2$), with a recovery efficiency of 25%, 1.6 kg was recovered sweet sorghum biochar;

At step (D), admixing 1.6 kg of sweet sorghum biochar with 6.35 kg of alkaline flake powder and 0.05 kg $ZnCl_2$ to obtain 8 kg of charcoal powder;

adding 4 liters of distilled water to 8 kg of charcoal powder to obtain 12 kg of the sixth temporary mixture;

drying 12 kg of the sixth temporary mixture to obtain 2.5 kg of the seventh temporary mixture;

heating 2.5 kg of the seventh temporary mixture to obtain 2.5 kg of the eighth temporary mixture; and cooling 2.5 kg of the eighth temporary mixture, then wash the first time with 25 liters of hydrochloric acid (HCl) 0.1 M solution, and wash the second time with distilled water to obtain 2.5 kg of the basic mixture;

At step (E), drying 2.5 kg of the basic mixture to obtain 1.25 kg of the porous carbon materials 111.

According to the exemplary embodiment of the present invention, the materials 1-materials 6 is obtained by example 1-example 6 have characteristics listed in Table 7 below.

Table 7. Characteristics of porous carbon materials derived from sweet sorghum according to example 1 to example 6

| Characteristics | Materials type | | | | | |
| --- | --- | --- | --- | --- | --- | --- |
|  | materials 1 | materials 2 | materials 3 | materials 4 | materials 5 | materials 6 |
| surface area ($m^2/g$) | 3500 | 3500 | 3200 | 3000 | 3300 | 3000 |
| pore size (nm) | 0.7 | 0.7 | 0.7 | 0.7 | 0.7 | 0.7 |
| hydrogen storage density ($g/cm^3$) | 0.07 | 0.1 | 0.07 | 0.05 | 0.06 | 0.05 |
| chemical stability, and maximum temperature (° C.) | 1000 | 1000 | 1000 | 1000 | 1000 | 1000 |
| hydrogen adsorption (%) | 7 | 6 | 5.5 | 5 | 5.5 | 6 |

According to the exemplary embodiment of the present invention, the electrical conductivity of sweet sorghum biochar of type materials 1-materials 6 is obtained by example 1-example 6 listed in Table 8 below.

| No. | Materials type | Electrical conductivity (S/cm) |
| --- | --- | --- |
| 1 | materials 1 | 250 |
| 2 | materials 2 | 300 |
| 3 | materials 3 | 200 |
| 4 | materials 4 | 270 |
| 5 | materials 5 | 250 |
| 6 | materials 6 | 200 |

The invention provides a hydrogen fuel storage device uses the porous carbon materials produced from *Sorghum bicolor* (L.) Moench to adsorb hydrogen fuel, replacing conventional hydrogen fuel storage devices (used to store hydrogen fuel liquid hydrogen fuel storage). The hydrogen fuel storage device uses sensors used to monitor the temperature and pressure inside the hydrogen storage space, the flow of hydrogen fuel loaded into the hydrogen storage space, the hydrogen fuel content inside the hydrogen storage space; temperature, pressure, and content of nitrogen inside the nitrogen storage space, etc. to monitor its performance during operation.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, element components, and/or groups thereof.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order, or steps may be added, deleted, or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

DESCRIPTION OF NUMERALS

100 Hydrogen fuel storage device
101 Pipe
101a Controller
101b Database
101c Communication channels
102 Hydrogen fuel input
102a Liquid hydrogen fuel tank
102b Gaseous hydrogen fuel tank
102-1 First valve
102-2 Second valve
103 Hydrogen fuel output
103a Pressure valve
103b Third valve
104 Nitrogen input
104a Nitrogen tank
104b Fourth valve
105 Nitrogen output
105a Fifth valve
106 Heating equipment
107 Vacuum pump
107a Sixth valve
110 Hydrogen storage space
111 Porous carbon material
120 Innermost shell
130 Inner shell
140 Nitrogen storage space
141 Liquid nitrogen
150 Insulation layer
160 Outer shell
170 Vacuum space
180 Sensors

What is claimed is:

1. A hydrogen fuel storage device, comprising:
an innermost shell forming a hydrogen storage space;
  wherein the hydrogen storage space is filled by porous carbon materials;
wherein the porous carbon materials derived from sweet sorghum (*Sorghum bicolor* (L.) Moench); wherein the porous carbon materials are obtained by comprising steps performed in the following specific order:
  i) preparing a bagasse sweet sorghum including steps:
    (a) collecting sweet sorghum stalks (*Sorghum bicolor* (L.) Moench); in which the sweet sorghum stalks have 12-14 Brix, and moisture of 75%-85%;
    (b) pressing the sweet sorghum stalks to collect bagasse; in which the bagasse includes the following characteristics: moisture of 45%-50%, 3-5 Brix, cellulose and hemicellulose content greater than 60%, and 13% lignin;
    (c) grinding and sifting the bagasse;
    (d) steaming the bagasse at step (c) at 121° C. for 27 minutes; mixing the bagasse after steaming with a preparation containing *Brevibacillus thermoruber* BT2 at a ratio of 0.5-1%, incubating at 25° C.-28° C., for 7-10 days to create a bagasse remove lignin;
    (e) soaking the bagasse remove lignin at step (d) in a mixed solution containing furfural ($C_5H_4O_2$), 2-aminophenol and deionized water at a ratio of 1:2 (wt/v); and then placed on a magnetic stirrer at 70° C. for 2-3 days; in which, the mixed solution contains the furfural ($C_5H_4O_2$), the 2-aminophenol and the deionized water at a ratio of (3-4):1:80 (v/v); and
    (f) drying said bagasse at step (c) at a temperature of 120° C., until the bagasse sweet sorghum reaches having moisture of 10%-15%; and then rinse once in deionized water and twice in 100% ethanol, to remove any remaining impurities;
    wherein, the sweet sorghum bagasse has a specific gravity of materials is $0.1691\pm0.002$ g/cm$^3$;
  ii) admixing a solid urea (($NH_2$)$_2$CO) at a ratio of 2,2-6,5% w/w and pyrazine with content of 1%-3% into the bagasse sweet sorghum at step (i) to create a third foundation mixture having 1%-3% by weight of nitrogen content; in which urea (($NH_2$)$_2$CO) having 46% by weight of nitrogen content;
  iii) heating the third foundation mixture at step (ii) and carbonizing in an inert gas environment with a heating rate of 4° C./min until the temperature reaches 500° C., then maintaining the temperature of 500° C. for 2 hours to create a sweet sorghum biochar;
    wherein, the inert gas environment is nitrogen ($N_2$) or Argon (Ar);
    wherein, the sweet sorghum biochar has a specific gravity of $0.1334\pm0.003$ g/cm$^3$;
  iv) activating the sweet sorghum biochar at step (iii) comprising steps performed in the following formula:
    (A) admixing 50 g of the sweet sorghum biochar at step (iii) with 150-200 g of an alkaline flake powder has a concentration of 80% and 1-3 g metal salt $ZnCl_2$ or $CuCl_2$ with stirring, then grinding to create a charcoal powder having a size of 1-2 mm; (B) adding 100 mL of distilled water to the charcoal powder at step (A) combined with stirring, then ultrasonic treatment at 20-40 kHz frequency for 20-25 hours to create a sixth temporary mixture;
    (C) drying the sixth temporary mixture at step (B) at 120° C. for 24 hours to create a seventh temporary mixture;
    (D) heating the seventh temporary mixture at step (C) comprising two stages:
      first stage: heating the seventh temporary mixture with a heating rate of 3° C./min until the temperature reaches 300° C. and maintaining the temperature of 300° C. for 1 hour;
      second stage: continue the heating process of the seventh temporary mixture with a heating rate of 3° C./min until the temperature reaches 800° C. and maintain the temperature of 800° C. for 2 hours, to create an eighth temporary mixture; and
    (E) cooling the eighth temporary mixture, then a first washing by 0.5 liters of hydrochloric acid (HCl)

0.1M solution, and a second washing by distilled water until the washing water has a pH of 6-7 to create a basic mixture;

v) drying the basic mixture at step (iv) at 110° C. for 12 hours to create the porous carbon materials;

an inner shell forms a shape surrounding the innermost shell;

a nitrogen storage space is formed between the innermost shell and the inner shell; wherein the nitrogen storage space contains liquid nitrogen that regulates the temperature of the hydrogen storage space;

an insulation layer surrounding the outer surface of the inner shell; wherein the insulation layer is made of aerogel material;

an outer shell surrounding the insulation layer;

a vacuum space is formed between the insulation layer and the outer shell;

a hydrogen fuel input is connected and communicated with the hydrogen storage space, configured to deliver liquid and/or gaseous hydrogen fuel from a liquid hydrogen fuel tank and/or a gaseous hydrogen fuel tank into the hydrogen storage space;

a hydrogen fuel output is connected and communicated with the hydrogen storage space, configured to discharge hydrogen fuel out of the hydrogen storage space;

a nitrogen input is connected and communicated with the nitrogen storage space, configured to deliver liquid nitrogen from nitrogen tank into the nitrogen storage space;

a nitrogen output is connected and communicated with the nitrogen storage space, configured to discharge nitrogen out of the nitrogen storage space;

a plurality of heating equipment is arranged inside the nitrogen storage space, wherein the liquid nitrogen contained in the nitrogen storage space is heated by means of the heating equipment, thereby increasing the temperature of the hydrogen storage space to release the hydrogen fuel from the porous carbon materials; and a plurality of sensors is arranged inside the hydrogen storage space and the nitrogen storage space.

2. The device of claim 1, wherein the porous carbon materials capable of adsorbing liquid and/or gaseous hydrogen fuel.

3. The device of claim 1, wherein the porous carbon materials have characteristics including surface area of 3000-4000 $m^2/g$, pore size of 0.7 mm, hydrogen storage density of 0.05-0.1 $g/cm^3$, chemical stability, maximum temperature of 1000° C., and hydrogen adsorption ($H_2$) is 5%-7%.

4. The device of claim 1, wherein the gaseous hydrogen fuel produced from the sweet sorghum comprising steps performed in the following specific order:

i) preparing materials including: a sweet sorghum stalk juice ingredient, a sweet sorghum seed powder ingredient, an alpha-amylase enzyme ingredient, a glucoamylase enzyme ingredient, an organic acid ingredient, a dark fermentation microorganism ingredient, and a light fermentation microorganism ingredient; wherein:

the sweet sorghum stalk juice ingredient is obtained by heating the juice from sweet sorghum stalks at 60° C.-70° C. until the Brix level reaches 15-18°Bx;

the sweet sorghum seed powder ingredient is finely ground to a size of 1-2 mm and has a moisture content of less than 12%;

the organic acid ingredient is selected from a group consisting of butyric acid, acetic acid, and combinations thereof;

the dark fermentation microorganism ingredient is obtained by mixing a first increased density solution with a second increased density solution in a ratio of (1-3):(1-3);

in which, prepare the first increased density solution by culturing a first microorganism strain on a first growth medium comprising: glucose ($C_6H_{12}O_6$) at 20 g/L, ammonium sulfate (($NH_4)_2SO_4$) at 5 g/L, potassium phosphate dibasic ($K_2HPO_4$) at 1 g/L, magnesium sulfate heptahydrate ($MgSO_4 \cdot 7H_2O$) at 0.5 g/L, manganese sulfate monohydrate ($MnSO_4 \cdot H_2O$) at 0.02 g/L, cobalt chloride hexahydrate at 0.01 g/L, vitamin B12 at 0.0001 g/L, and biotin at 0.000005 g/L; wherein the first microorganism strain is selected from a group consisting of *Clostridium acetobutylicum* ATCC 824 (with a designated identifier in the gene bank being AE001438.3), *Clostridium acetobutylicum* ATCC 4259 (with a designated identifier in the gene bank being U09978.1), *Clostridium acetobutylicum* ATCC 39058 (with a designated identifier in the gene bank being U16164.1), and *Clostridium acetobutylicum* TT01 (SEQ ID No. 1);

in which, prepare the second increased density solution by culturing a second microorganism strain on a second growth medium comprising: cellobiose at 5 g/L, peptone at 5 g/L, yeast extract at 5 g/L, sodium bicarbonate ($NaHCO_3$) at 3.5 g/L, ammonium sulfate (($NH_4)_2SO_4$) at 3 g/L, resazurin at 0.001 g/L, L-cysteine hydrochloride at 0.1 g/L, vitamin B12 at 0.0001 g/L, and biotin at 0.000005 g/L; wherein the second microorganism strain is selected from a group consisting of *Caldicellulosiruptor saccharolyticus* Tp8T.6331 (with a designated identifier in the gene bank being NR_036878.1), *Caldicellulosiruptor saccharolyticus* DSM 8903 (with a designated identifier in the gene bank being NR_074845.1), and *Caldicellulosiruptor saccharolyticus* TT02 (SEQ ID No. 2);

the dark fermentation microorganism ingredient contains the first microorganism strain with a cell density of $10^9$ CFU/mL and the second microorganism strain with a cell density of $10^9$ CFU/mL;

the light fermentation microorganism ingredient is obtained by culturing a third microorganism strain on a third growth medium comprising: glucose ($C_6H_{12}O_6$) at 10 g/L, yeast extract at 5 g/L, peptone at 5 g/L, sodium chloride (NaCl) at 5 g/L, magnesium sulfate heptahydrate ($MgSO_4 \cdot 7H_2O$) at 1 g/L, potassium dihydrogen phosphate ($KH_2PO_4$) at 1 g/L, and calcium chloride dihydrate ($CaCl_2 \cdot 2H_2O$) at 0.1 g/L;

wherein the third microorganism strain is selected from a group consisting of *Rhodobacter sphaeroides* KD131 (with a designated identifier in the gene bank being CP001150.1), *Rhodobacter sphaeroides* ATCC 17029 (with a designated identifier in the gene bank being CP000579.1), *Rhodobacter sphaeroides* ND42 (with a designated identifier in the gene bank being PP702412.1), and *Rhodobacter sphaeroides* TT03 (SEQ ID No. 3);

wherein the light fermentation microorganism ingredient contains the third microorganism strain with a cell density of $10^9$ CFU/mL;

ii) creating a first temporary mixture by performing steps (a) to (c), comprising:
  (a) mixing the sweet sorghum stalk juice ingredient with the sweet sorghum seed powder ingredient in a ratio of 1:(0.06-0.15) (w/w) at 70° C., then stirring well;
  (b) increasing the temperature to 90° C., maintaining at 90° C. for 3-5 minutes; and
  (c) reducing the temperature to 85° C., maintaining at 85° C. for 60 minutes;

iii) creating a second temporary mixture by mixing the alpha-amylase enzyme ingredient with the first temporary mixture in a ratio of (0.05-0.2):1000 (w/w), adjusting the pH to 5.5-6.5, then incubating at 90° C.-100° C. for 30-60 minutes;

iv) creating a third temporary mixture by performing steps (a') to (c'), comprising:
  (a') mixing the glucoamylase enzyme ingredient with the second temporary mixture in a ratio of (0.05-0.2):1000 (w/w), adjusting the pH to 4.0-5.0;
  (b') incubating at 90° C.-100° C. for 30-60 minutes; and
  (c') cooling to a temperature of 25° C.-30° C.;

v) creating a first base mixture by performing steps (a") to (c"), comprising:
  (a") mixing the glucoamylase enzyme ingredient with the third temporary mixture in a ratio of (0.05-0.2):1000 (w/w) and stirring well to obtain a fourth temporary mixture;
  (b") mixing the organic acid ingredient with the fourth temporary mixture in a ratio of (2-5):1000 (w/w) and stirring well to obtain a fifth temporary mixture; and
  (c") mixing the dark fermentation microorganism ingredient with the fifth temporary mixture in a ratio of (1-2):1000 (w/w) and stirring well to obtain the first base mixture;

vi) fermenting the first base mixture under dark conditions at a temperature of 25° C.-30° C. for 22-26 hours to produce a first hydrogen gas and a dark fermented base mixture; wherein the pH is controlled from 6.0-6.5 and the dissolved oxygen concentration is controlled to be less than 1%;

vii) creating a second base mixture by mixing the light fermentation microorganism ingredient with the dark fermented base mixture in a ratio of (1-2):1000 (w/w) and stirring well; and viii) fermenting the second base mixture under light conditions at a light intensity of 1500-2000 lux, a temperature of 25° C.-30° C., a stirring speed of 200-300 rpm, and for a duration of 22-26 hours to produce a second hydrogen gas; wherein the pH is controlled from 6.5-7.0.

5. The device of claim 4, wherein the sweet sorghum seed powder ingredient has a starch content of 65% to 70%.

6. The device of claim 1, wherein the liquid hydrogen fuel is obtained by liquefying the gaseous hydrogen fuel; wherein the liquid hydrogen fuel has a temperature of 20K (−253° C.) and a pressure of 101 kPa.

7. The device of claim 1, wherein the innermost shell is made of aluminum alloy.

8. The device of claim 1, wherein the inner shell is made of carbon fiber reinforced composite material.

9. The device of claim 1, wherein the outer shell is made of carbon fiber reinforced composite material.

10. The device of claim 1 further comprising a vacuum pump is connected to the vacuum space, operable to provide a vacuum pressure to the vacuum space.

11. The device of claim 1 further comprising a pressure valve installed on the hydrogen fuel output operable to regulate the pressure in the hydrogen storage space.

12. The device of claim 1, wherein the plurality of sensors comprising temperature sensors, pressure sensors, flow sensors, time sensors, content sensors.

* * * * *